United States Patent
Ferrier et al.

(10) Patent No.: US 12,423,668 B2
(45) Date of Patent: Sep. 23, 2025

(54) SYSTEM AND METHOD FOR PAIRING DEVICES TO ESTABLISH DEVICE GROUPS

(71) Applicant: Shopify Inc., Ottawa (CA)

(72) Inventors: Andrew Ferrier, Montreal (CA); Daanish Maan, Brampton (CA); Michael Joseph DeFazio, Fonthill (CA); James Lepp, Ottawa (CA); Hettige Ray Perera Jayatunga, Toronto (CA); Neil Leonard Padgett, Toronto (CA)

(73) Assignee: Shopify Inc., Ottawa (CA)

( * ) Notice: Subject to any disclaimer, the term of this patent is extended or adjusted under 35 U.S.C. 154(b) by 605 days.

(21) Appl. No.: 17/812,801

(22) Filed: Jul. 15, 2022

(65) Prior Publication Data
US 2024/0020670 A1 Jan. 18, 2024

(51) Int. Cl.
*G06Q 20/20* (2012.01)

(52) U.S. Cl.
CPC ......... *G06Q 20/202* (2013.01); *G06Q 20/208* (2013.01)

(58) Field of Classification Search
CPC .... G06Q 20/202; G06Q 20/208; G06Q 20/20; G06Q 20/32; H04W 4/08; H04W 8/005; H04W 8/186; H04W 12/63; H04W 84/18
See application file for complete search history.

(56) References Cited

U.S. PATENT DOCUMENTS

| | | | | |
|---|---|---|---|---|
| 8,750,799 | B2* | 6/2014 | Giles | H04W 4/21 455/41.2 |
| 8,972,283 | B2* | 3/2015 | Hicks | G06Q 30/0281 705/17 |
| 9,665,861 | B2* | 5/2017 | Fernando | G06Q 20/203 |
| 9,954,975 | B2* | 4/2018 | Raleigh | H04L 67/55 |
| 10,034,316 | B2* | 7/2018 | Reshef | H04W 76/11 |
| 10,453,047 | B2* | 10/2019 | Hicks | G06Q 20/327 |
| 10,489,840 | B2* | 11/2019 | Nelms | G06Q 30/0283 |
| 11,138,581 | B2* | 10/2021 | Fernando | G06F 1/1696 |
| 11,589,202 | B2* | 2/2023 | Zarakas | G06Q 20/341 |
| 11,829,978 | B2* | 11/2023 | Gaudin | G06Q 20/145 |
| 2012/0144473 | A1* | 6/2012 | Wyld | H04M 1/72412 726/7 |
| 2013/0103478 | A1* | 4/2013 | Fisher | H04W 4/21 705/14.23 |

(Continued)

FOREIGN PATENT DOCUMENTS

WO WO-2021128226 A1 * 7/2021

*Primary Examiner* — Michael Jared Walker
(74) *Attorney, Agent, or Firm* — CPST Intellectual Property Inc.; Brett J. Slaney

(57) ABSTRACT

A system and method are provided for pairing devices to establish device groups. The method includes receiving, at a server associated with a plurality of client devices and a plurality of accessory devices, a first request to establish a device group comprising a first client device of the plurality of client devices and a first accessory device of the plurality of accessory devices. The first request identifies the first client device and the first accessory device. The method also includes establishing the device group comprising the first client device and the first accessory device. The device group, once established, allows the first client device to utilize the first accessory device.

22 Claims, 12 Drawing Sheets

(56) References Cited

U.S. PATENT DOCUMENTS

| | | | |
|---|---|---|---|
| 2013/0103847 A1* | 4/2013 | Brown | H04W 4/21 |
| | | | 709/229 |
| 2014/0019274 A1* | 1/2014 | Hardin | G06Q 20/202 |
| | | | 705/21 |
| 2014/0249943 A1* | 9/2014 | Hicks | G06Q 20/204 |
| | | | 705/17 |
| 2015/0199667 A1* | 7/2015 | Fernando | G06Q 20/202 |
| | | | 705/21 |
| 2015/0199882 A1* | 7/2015 | Fernando | G07G 1/0018 |
| | | | 345/173 |
| 2016/0014668 A1* | 1/2016 | Chou | H04W 76/14 |
| | | | 455/7 |
| 2016/0127600 A1* | 5/2016 | Beatty | H04N 1/00244 |
| | | | 358/1.15 |
| 2018/0063373 A1* | 3/2018 | Hardy | H04N 1/4413 |
| 2018/0150820 A1* | 5/2018 | Schultze | G06Q 20/202 |
| 2019/0303938 A1* | 10/2019 | Sanchez-Llorens | G06Q 20/405 |
| 2020/0045519 A1* | 2/2020 | Raleigh | H04W 4/08 |
| 2020/0250644 A1* | 8/2020 | Oberholtzer | G06Q 20/027 |
| 2021/0042730 A1* | 2/2021 | Lee | G06Q 20/308 |
| 2021/0051039 A1* | 2/2021 | Qiao | H04W 76/10 |
| 2022/0078219 A1* | 3/2022 | D'Amato | H04L 65/65 |
| 2022/0237573 A1* | 7/2022 | Jessamine | G06F 21/629 |
| 2023/0289811 A1* | 9/2023 | Patel | G06Q 20/202 |

\* cited by examiner

SYSTEM AND METHOD FOR PAIRING DEVICES TO ESTABLISH DEVICE GROUPS

TECHNICAL FIELD

The following relates generally to pairing electronic/computing devices to establish device/peripheral groups, and, in particular, to establishing logical pairings between client computing devices and accessory devices to enable the logical pairings and allow those client devices to utilize the accessory devices.

BACKGROUND

In many computing devices, such computing devices may be used with peripherals such as, for example, printers. Computing device peripherals can be challenging to setup, pair, configure, and adjust. For example, retail settings such as stores, booths, kiosks, and the like typically require electronic devices for scanning items, calculating amounts owing, and tracking sales at the point-of-sale (POS); making electronic payments; and printing receipts.

BRIEF DESCRIPTION OF THE DRAWINGS

Embodiments will now be described with reference to the appended drawings wherein.

DETAILED DESCRIPTION

Figure 1:
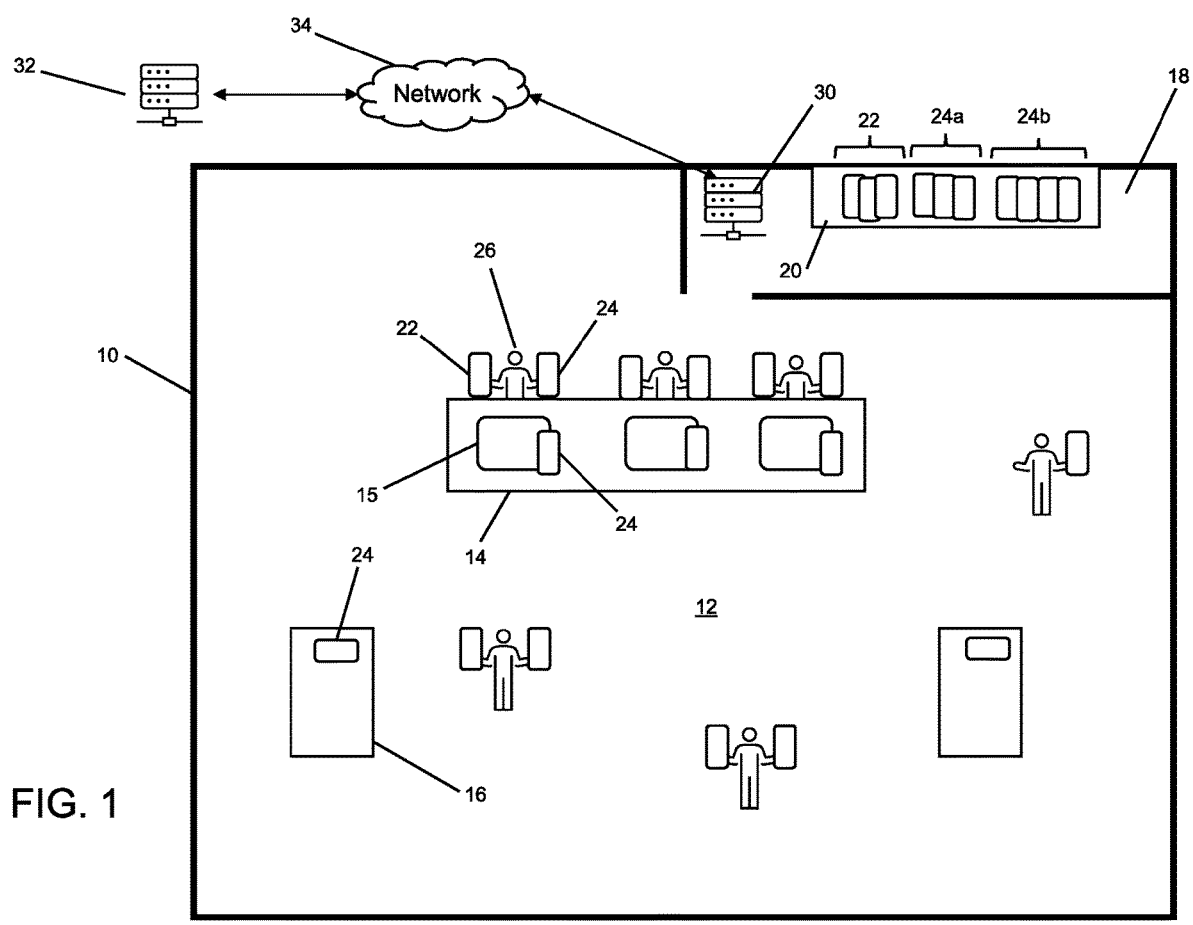
FIG. 1 is a schematic plan view of an example of a retail environment.

Current work flows that use computing devices paired with peripherals can create several challenges for users, such as warehousing, retailers, etc. For example, many retail POS systems (arranged and configured together from these devices) use wired connections to increase the reliability of those systems and to decrease the complexity of setting up the system when compared to wireless POS systems. In many settings, wired connections pose additional challenges as they require POS terminals in specific locations within the retail setting. In smaller retail settings such as a farmer's market table or a food truck, wired connections may be inconvenient to set up, particularly with a single POS location, but require a wireless Internet connection to exchange data with payment and inventory systems. Similar challenges arise when it is desirable to have employees, equipped with POS devices, roam about the retail environment, e.g., to assist customers in different locations. These challenges can also arise in other settings such as warehouses (e.g., with scanners, label printers, handhelds, etc.)

Wireless POS systems are therefore preferable to wired connections. However, wireless systems can bring a different set of challenges. For instance, when the POS workflow uses multiple devices, these devices normally require pairing with each other or at least with one other device in the workflow. However, pairing and set-up along with potential connectivity/compatibility issues can result, particularly with users that are not tech savvy.

Even with experienced users and high quality equipment, pairing and using wireless devices can have limitations. For example, many devices that are used or desired to be used in retail settings (e.g., mobile phones, tablets, etc.) operate using standard communication protocols such as WiFi, Bluetooth, near field communication (NFC), or infrared (IR). Paired devices can use Bluetooth; however, Bluetooth pairings are normally 1-to-1. Moreover, Bluetooth network stacks in smartphones, tablets and peripherals are generally static, as in they only remember one pairing (or in some cases cache a few (e.g., four (4)), but have poor interfaces to switch between pairings. Pairing itself can be limited as the Bluetooth standard's master/slave model may only allow a peripheral to connect to one phone/tablet device at a time.

As the retail industry moves from basic POS setups of single dedicated checkouts (or single vendors—e.g., at a farmer's market) using a single tablet, card reader, receipt printer and optional barcode scanner; to more complex workflows in larger retail floors or even department stores (with many employees and many POS terminals); the naïve wired connections and/or 1-to-1 wireless pairings may no longer suit the demands of the POS workflow. A similar situation can arise in complex environments using computing devices and peripherals, such as warehousing, medical environments, educational environments, etc.

To address these demands, and the above challenges, multi-device groupings (hereinafter "device groups") in retail, and other settings that require intercommunications between the devices in the group, can be established using logical pairings above the network level. In this way, the naïve one-to-one pairings can be avoided, and devices can be periodically and/or dynamically grouped and utilized together in workflow sessions (such as POS workflows), while being agnostic to the network type used to connect the devices at the network layer.

The device groups can be either rigid or dynamic (or both) allowing for organizations to circulate multiple ones of the same devices and establish different groups and individual pairings as and when needed. Moreover, the logical pairings can be controlled at the server, which can be a local or a cloud-based server, to allow for overlapping relationships between groups, for example where two or more groups can access and utilize a shared accessory device. While the following examples may be provided in the context of a retail POS workflow, it is appreciated that the principles and system configurations described herein can apply in various other settings where groupings of devices are used in certain specific workflows, including education, scientific experimentation, manufacturing, warehousing, healthcare, amusement parks, etc.

In one aspect, there is provided a computer-implemented method. The method includes receiving, at a server associated with a plurality of client devices and a plurality of accessory devices, a first request to establish a device group comprising a first client device of the plurality of client devices and a first accessory device of the plurality of accessory devices, the first request identifying the first client device and the first accessory device; and establishing the device group comprising the first client device and the first accessory device; wherein, the device group, once established, allows the first client device to utilize the first accessory device.

In another aspect, there is provided a server comprising a processor, a communications module, and at least one memory. The at least one memory stores computer executable instructions that, when executed by the processor, utilize the processor and communications module to: receive, at the server, being associated with a plurality of client devices and a plurality of accessory devices, a first request to establish a device group comprising a first client device of the plurality of client devices and a first accessory device of the plurality of accessory devices, the first request identifying the first client device and the first accessory device; and establish the device group comprising the first client device and the first accessory device; wherein, the device group, once established, allows the first client device to utilize the first accessory device.

In another aspect, there is provided a computer readable medium comprising computer executable instructions that, when executed by a processor of a server, cause the server to: receive, at the server, being associated with a plurality of client devices and a plurality of accessory devices, a first request to establish a device group comprising a first client device of the plurality of client devices and a first accessory device of the plurality of accessory devices, the first request identifying the first client device and the first accessory device; and establish the device group comprising the first client device and the first accessory device; wherein, the device group, once established, allows the first client device to utilize the first accessory device.

In certain example embodiments, the method can include receiving a second request from the first client device to utilize the first accessory device; and initiating an operation by the first accessory device based on the second request, by communicating with the first accessory device.

In certain example embodiments, the method can include receiving a request to add a second accessory device to the device group, the device group to be updated to comprise the first client device, the first accessory device, and the second accessory device, the request to add the second accessory device comprising an identifier for the second accessory device; and updating the device group. The method can also include determining that a device type of the second accessory device is the same as a device type of the first accessory device; and replacing the first accessory device with the second accessory type in the device group. The method can also include determining that a device type of the second accessory device is the same as a device type of the first accessory device; and updating the device group to comprise the first client device and a plurality of first accessories of the same device type.

In certain example embodiments, the first request can include a request to dynamically establish the device group with the first accessory device based on a proximity between the first client device and the first accessory device, and the method can further include initiating an operation by the first accessory device based on the request to dynamically establish the device group. Initiating the operation can include receiving data from the first client device; and sending the data to the first accessory device to execute the operation.

In certain example embodiments, the method can include receiving a further request to establish a logical pairing in the device group between a second client device and one of the plurality of accessory devices, the further request identifying the second client device and the one of the plurality of accessory devices; and establishing the logical pairing within the group between the second client device and the one of the plurality of accessory devices; wherein, the logical pairing, once established, allows the second client device to utilize the one of the plurality of accessory devices identified in the further request.

In certain example embodiments, the method can include expiring the device group at a defined time. The defined time can include at least one of an end time or a time duration since the device group was established.

In certain example embodiments, the method can include receiving an alert comprising a status for the first accessory device; and based on the status, updating the device group and communicating with a first replacement device to replace a functionality of the first accessory device for the first client device in the device group.

In certain example embodiments, the first client device includes a point of sale (POS) application for a retail environment and wherein the first accessory device executes at least one operation in a retail POS workflow implemented via the POS application.

In certain example embodiments, communicating with the first accessory device can be performed by communicating with the second accessory device to establish a logical pairing with the second accessory device, and initiating establishment of the device group to comprise the first accessory device via the second accessory device. The second accessory device can be a scanner, the scanner being paired with the first client device as a proxy to add the first accessory device to the device group.

In certain example embodiments, the method can include displaying a control panel user interface, the control panel user interface providing a visual depiction of the device group comprising the first client device and the first accessory device.

In a retail setting, POS workflows typically include a POS device, which can be a custom device or, increasingly, a portable computing device such as a smartphone or tablet running a POS app. The POS device often relies on one or more peripheral or accessory devices. For example, the POS device may connect to a barcode scanner to scan items at checkout, which are tabulated in the POS app and totals calculated with applicable taxes, discounts, etc. The POS device is often connected, associated or "tied" into a back-end retail inventory system and accepts various types of payments against a purchase being completed. While cash is often an option, the POS device would normally include at least one electronic payment option such as debit or credit cards. As such, another accessory device connected to the POS device may be a card reader that connects to one or more payment systems. While e-receipts are becoming more common, retailers typically provide an option to print a physical/paper receipt. Thus, yet another accessory device connected to the POS device (or integrated into the card reader), may be a printer.

To understand the above-noted challenges and difficulties, a typical scenario will now be outlined assuming a retail establishment with multiple employees using a set of wireless devices including a POS device, scanner, card reader, and printer.

In this scenario, the wireless devices are collected at the end of a shift and plugged into charging cords or charging stations to provide sufficient battery power for the next shift. Therefore, at the beginning of each shift, each employee would be tasked with selecting a set of devices to be used for their shift, particularly if the devices are used by a "roaming" employee or otherwise not at a dedicated station. This requires the employees to select a group of devices that are already paired with each other or to connect the set they have chosen for that shift. Either situation can lead to the above-mentioned difficulties as this would require markings to identify sets or leave it to the employees to navigate pairing and compatibility issues that can arise. In a one-to-one pairing paradigm, these pairings could require ensuring that the devices have been paired and then, in the case of Bluetooth, may require switching between pairings as the different accessories are needed. Alternatively, limitations could be placed on the types of devices used (e.g., combined card reader and printer and/or combined scanner and POS device). However, these limitations reduce the fluidity of the POS workflow and makes setup and shutdown and the beginning and end of shifts more difficult and prone to user error.

The proposed system uses logical pairings above the network layer to enable any device connected to the network used by the system to join a multi-device group through interactions with other devices in the group or by being paired remotely by a server used by the system.

In this example scenario, each device used in the retail POS workflow is connected to the same network as a commerce system server. The server can be located at the retail establishment or can be cloud-based. The network in this example is a wireless infrastructure network such as Wi-Fi or 5G, or a wireless mesh network, but could also be adapted for use in a wired network such as Ethernet. The system is therefore agnostic to the network used by the retail establishment. The devices, once connected to the network, can then register with the commerce system server. This allows the devices to be addressable within the network to establish the logical pairings. The server can use a network address unique to the device and an authentication credential such as a one-time key, token, certificate, code, etc., to allow the devices to authenticate each other. The address and credential(s) can be encoded in machine-readable indicia such as a barcode (e.g., a 2D barcode or QR code), token, or other data structure such as a keyed code or OCR operation, that is capable of being read and shared between devices. For example, an NFC token can be shared by "tapping" devices or displayed barcodes scanned using a camera or optical scanner. Registering the devices can be done in various ways, including dynamically using other devices already in the network or in a more traditional manual set up process. Such dynamic setups can be implemented by setting up a main device such as the POS device and using the POS app to connect to the various accessory devices to register them with the network. Ideally all devices can independently connect to the network and communicate directly with the server, however, the system can be configured to allow certain peripheral devices to connect to other devices as a proxy. For example, a POS device running the POS app may require a network connection to communicate with backend systems, however, a barcode scanner may only require a connection to the POS device as an input device for scanning items.

In this scenario, the scanner could still be used as a proxy device to create logical pairings between the POS device and other accessories. For example, an employee can begin a pairing session for a group of devices by scanning the POS device with a scanner they plan to use to couple the scanner to the POS device. This then allows the scanner to be used to scan a barcode displayed by a card reader and/or printer to bring these other devices into the group. Since the barcode is bound or associated with the POS device, the proxy pairing can either initiate a registration by the other device directly or through the POS device via the scanner. Alternatively, the POS device, if equipped with a camera, can scan barcodes displayed by other devices either electronically or physically.

Any or all device groups can be made permanent, semi-permanent, or session based. The pairing(s) can also expire at a defined time. For example, the defined time can be a determined or predetermined amount of time to allow the groupings to be periodically refreshed and/or new credentials to be generated for security purposes. The expiry of the groupings at a defined time may be tied to the end of shift function in the POS app. The expiry of the groupings may be triggered by shift scheduling software.

Each device that is brought into the network is identified by at least one of the other devices in the group (e.g., via barcode scanning, tapping, etc.) and associated or bound to the group via a device that can communicate with the server, or is identified as being in that group directly by the server, e.g., via another interface such as a control panel. For devices that are also connected to the network, their network address and an authentication credential can be used to create the logical pairing(s) at the server. The server can store a pairing reference table or other data structure to redirect data between devices in the group. For example, a POS device can trigger an electronic payment via the network by having the server redirect a request to the card reader that is currently paired with the POS device. The card reader may then obtain the payment card number and an associated personal identification number (PIN) which is redirected back to the appropriate POS device that made the request. After accepting payment, the POS device can then request a printed receipt, which is redirected to the currently paired printer or to an otherwise appropriate printer.

By having logical pairings established within device groups determined at the server, and thus above the network layer, further flexibility can be provided. For example, in the above scenario, the server's reference table can be used to allow multiple POS devices to share a card reader and/or printer and queue up multiple jobs if necessary. Dynamic pairings can also be implemented. For example, a POS device that currently needs to print a receipt can communicate with the server to determine the most appropriate printer to use, based on proximity and/or radio frequency (RF) strength. By having the devices connected to the same network, the server can periodically ping the devices to determine signal strength, battery levels, and other metrics such as amount of paper left if such metrics are known to the device. In this way, hybrid groups are possible, with a set of logically-paired devices and one or more dynamically-paired devices that may be used in multiple groups.

Since the devices are portable and expected to be carried around a store or otherwise be untethered, an employee may periodically need to confirm which devices are paired in their group. For example, an employee that carries their POS device, card reader, and scanner around may place them on a table or workstation periodically. If multiple employees do this there may be a need to confirm which of the devices belong in which group. The logical pairings established and stored as device groups established by the server, via the network, can allow an employee to use a "find my group" or "find my device" feature in the POS app to have paired devices light up, make a sound, vibrate or otherwise provide a detectable cue to confirm that, for example, a given card reader is paired with a given POS device to avoid confusion by mixing and matching unpaired devices. However, if certain devices do not have a suitable output device such as an LED, screen, or speaker, the aforementioned pairing routine can be readily employed to create new pairings on the fly. For example, a POS device app could include a "forget" option for a specific device which can be selected and followed by a re-pairing procedure by scanning the new device. This workflow can also be employed when devices need to drop out of a group as batteries need recharging or other features malfunction or if the device cannot communicate.

The server can also be used to host or otherwise provide a control panel or dashboard-type user interface (UI) to manage the groups and individual pairings, e.g., by a store manager, or to get a snapshot of pairings within the establishment at that moment. The UI can also be configured to provide an interactive screen to allow a user, such as a manager or supervisor, to make or break logical pairings manually.

The server also provides an ability to perform automatic monitoring, alerts, and notifications. Each device that is connected to the network can communicate with the server using heartbeat signals or other periodic communications to report status information such as battery power, amount of paper left, signal strength, etc. The server can use this information to alert an employee that the printer they are connected to is low on battery or is about to run out of paper to prompt them to connect to a new device or to reload. Similarly, if the server detects that a card reader is having connectivity problems or is likewise low on battery, any POS device connected to that card reader can be notified to create a new pairing to avoid disruptions in the retail check workflow. These alerts and notifications can be sent to the individual employees or a manager to manually address the issues. For example, a manager can be equipped with a control panel app that notifies them of any faulty or depleted device to proactively swap out devices with their employees to avoid frustrating scenarios where devices are not working when they are needed. The alerts and notifications can be sent from the server or displayed on the POS in alignment with the POS checkout process, for example notifying about the status of the printer before printing, or the status of the card reader before a card tap/swipe is requested. The server and control panel functionality can therefore be implemented in several ways to provide backend functionality that automatically or manually supports the front line users that are operating the devices paired in the multiple-device groupings.

Turning now to the figures, FIG. 1 illustrates an example of a retail environment 10 such as a store, restaurant or other retail establishment, having a retail area 12 in which customers can move about along with users 26 of the retail establishment (e.g., employees). For example, it is typical for a retail store to have a showroom or other retail area 12 displaying goods being sold at that store. Similarly, a restaurant may include a number of tables set about the retail area 12 for customers to be seated for eating. As noted above, while these examples are in the context of a retail environment, the principles illustrated can be applied in other settings where multiple devices can be used together in groups.

Users 26 such as checkout, advisory, or serving staff may be arranged in fixed locations or be allowed to roam the retail area 12 to assist customers. In this example, a checkout counter 14 is provided, with a number of checkout stations 15. Each checkout station 15 in this example includes infrastructure to permit employees to operate one or more client devices 22 and one or more accessory devices 24 used by the client device(s) 22. In this example, a client device 22 refers to a device that is used by the user 26 to control a retail process, such as a checkout, price checking or other process, while an accessory device 24 refers to a device that is utilized by the client device 22 in such a process. It can be appreciated that a client device 22 may also include a functionality that permits it to also perform as an accessory device 24. Similarly, an accessory device 24 may also include functionality that allows it to operate as a client device 22 in certain process workflows. That is, certain electronic devices may be operable as either or both a client device 22 and an accessory device 24, interchangeably in different scenarios.

The retail environment 10 shown in FIG. 1 can be configured to provide sets of devices 22, 24 that can be grouped together to form device groups having logical pairings between the devices in the group. In this way, an user 26 can utilize a set or group of individual devices 22, 24, each of which are part of a set of similar or identical devices. For example, in the retail environment 10 shown in FIG. 1, each user 26 may use a smartphone or tablet device as the client device 22, which includes a POS app to control a checkout process. Such electronic client devices 22 can include, but are not limited to, a mobile phone, a personal computer, a laptop computer, a tablet computer, a notebook computer, a hand-held computer, a personal digital assistant, a portable navigation device, a wearable device, a gaming device, an embedded device, a smartphone, a virtual reality device, an augmented reality device, etc.

The client device 22 can connect to one or more accessory devices 24, depending on the other functions required in that process and the capabilities of the available accessory devices 24. For example, the user 26 at a fixed checkout station 15 may utilize a scanner accessory device 24 to enable the user 26 to scan barcodes of items being purchased by a customer, a printer accessory device 24 to enable the user 26 to print a receipt, and a payment card reader accessory device 24 to enable the user 26 to enter or accept inputs providing payment details such as a credit or debit card number and a PIN. Other users 26 may utilize as many, more, or fewer devices 22, 24. For example, as shown in FIG. 1, a secondary checkout station 16 may include a printer accessory device 24 and/or card reader accessory device 24 with roaming users 26 having a client device 22 and a scanner accessory device 24. In this way, different device groups that are suitable for different roles or locations can be created.

The retail environment 10 in FIG. 1 also includes a backroom, employee lounge or other separate area 18 from the retail area 12. In this example, the separate area 18 includes a backroom with a device docking station 20 or other table for storing and charging a set of client devices 22 and sets of accessory devices 24a, 24b, 24c, etc. This example illustrates that the sets of devices 22, 24 to be conveniently wireless when in use, likewise require charging and may also require a check-out/check-in process by users 26 to gather and put back their devices 22, 24 at the beginning and end of a shift. Also shown in the other area 18 is a local network device 30 used to pair, group, and track the devices 22, 24 in logical pairings above the network level by communicating with at least some of the devices 22, 24. In a closed local system, the network device 30 may include a local server. In a cloud-based or other remote server configuration, the local network device 30 may include a router or hub that connects locally to the devices 22, 24, and to a cloud-based server 32 accessible via one or more communication networks 34. For ease of references, either or both devices 30, 32 may be referred to herein as a server, server device, cloud-based server, or network device interchangeably.

Such communication network(s) 34 may include a telephone network, cellular, and/or data communication network to connect different types of client- and/or server-type devices. For example, the communication network may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

The device groups and logical pairings that are established using the client and accessory devices 22, 24 can therefore be tracked and managed locally, remotely, or both. For example, local tracking and control can be provided to a supervisor who has access to the cloud-based server 32, which can be used by a head office to maintain statistics or other data concerning the retail environment 10, including tracking the number and state of the devices 22, 24. The connectivity with the network 34 also enables multiple retail environments 10 to be managed centrally and to have the systems and processes discussed herein integrated with other systems such as inventory management, sales, and e-commerce sites.

Figure 2:
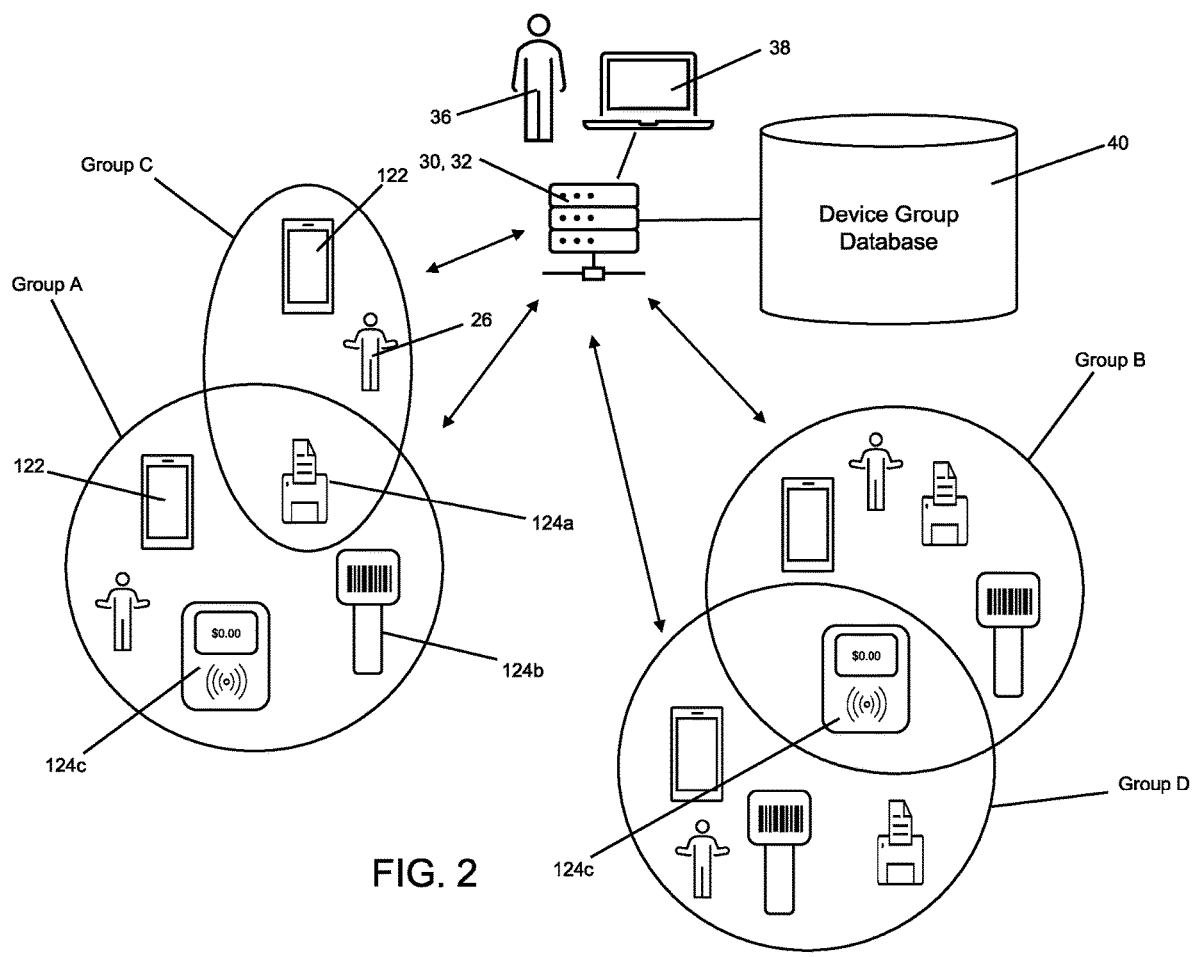
FIG. 2 is an example of a number of groups of devices used by individual users.

FIG. 2 illustrates an example arrangement of device groups, in this example, Groups A, B, C, and D. These groups each communicate, using at least one device 22, 24 in the group, with the network/server 30, 32 (i.e., whether local or cloud-based as noted above). The local network device 30 or cloud-based server 32 includes or has access to a device group database 40, which is used to form and track the groups and stores logical pairings between devices that form the groups, in order to enable a client device 22 to communicate with and initiate an operation for it using an appropriate accessory device 24. The local network device or cloud-based server 32 can be coupled to an administrator device 38 such as a laptop in this example but could be any suitable electronic device having a display and input device(s). It may be noted that the administrator device 38 may be the same or similar type of device and software as client device 122 logged in with an administrator account to view the administrator features, or it may be a different type of device than employees' devices. The administrator device 38 can be used by an administrator 36 such as a manager, supervisor, shift lead, group leader, boss, or other person that has at least some responsibility over the users 26 that utilize the groups of devices 22, 24. In this example, Group A includes a smartphone 122 that includes a POS app (not shown), and three accessory devices 124a, 124b, and 124c. In Group A, the first accessory device 124a corresponds to a printer accessory (hereinafter also referred to as a printer 124a), the second accessory device 124b corresponds to a scanner accessory (hereinafter also referred to as a scanner 124b), and the third accessory device 124c corresponds to a card reader accessory (hereinafter also referred to as a card reader 124c). The pairings within Group A can be established as logical pairings in the device group database to enable, for example, the smartphone client device 122 to send an instruction to the printer 124a to print a receipt. As shown in FIG. 2, Group C is composed of a smartphone client device 122 and the printer 124a that is also used in Group A. For example, Groups A and C may include an employee at a checkout station 15 and a roaming user 26 that both used the same printer to complete a sale. The smartphone client device 122 in Group C may also include onboard scanning and card reading functionalities to illustrate that some devices require fewer accessories and can share with other groups.

Group D includes a similar collection of devices when compared to Group A but in this example shares a card reader 124c with Group B. Group B includes the same four devices in the set as Groups A and B but shares the card reader 124c. For example, the users 26 associated with Groups B and D may be located next to each other at a retail counter 14 and thus share at least some infrastructure. As seen in FIG. 2, a team of users 26 can pair devices to establish device groups that include any number of desired devices 22/24, 122/124 that suits the employee's role and requirements. The groups shown in FIG. 2 can be made dynamically on the fly (e.g., to find a closest printer) or can be established for a fixed period such as a work shift, e.g., at the beginning of the shift. The groups can expire or be expired under certain criteria such as a time duration (number of hours, end of shift, etc.) or manually by the user 26 or administrator 36. For example, if an user 26 leaves during a shift, a supervisor can have the group for that user 26 terminated or temporarily suspended until the employee returns, which may require a new pairing and group establishment process. Various other options can be integrated into the group setting, such as a "find my device" locator feature to enable users 26 to locate devices in their device group that are misplaced. Similarly, when accessory devices 24 are no longer needed or need to be swapped or replaced, dynamic group updating can be performed by utilizing a "forget this device" feature.

Figure 3:
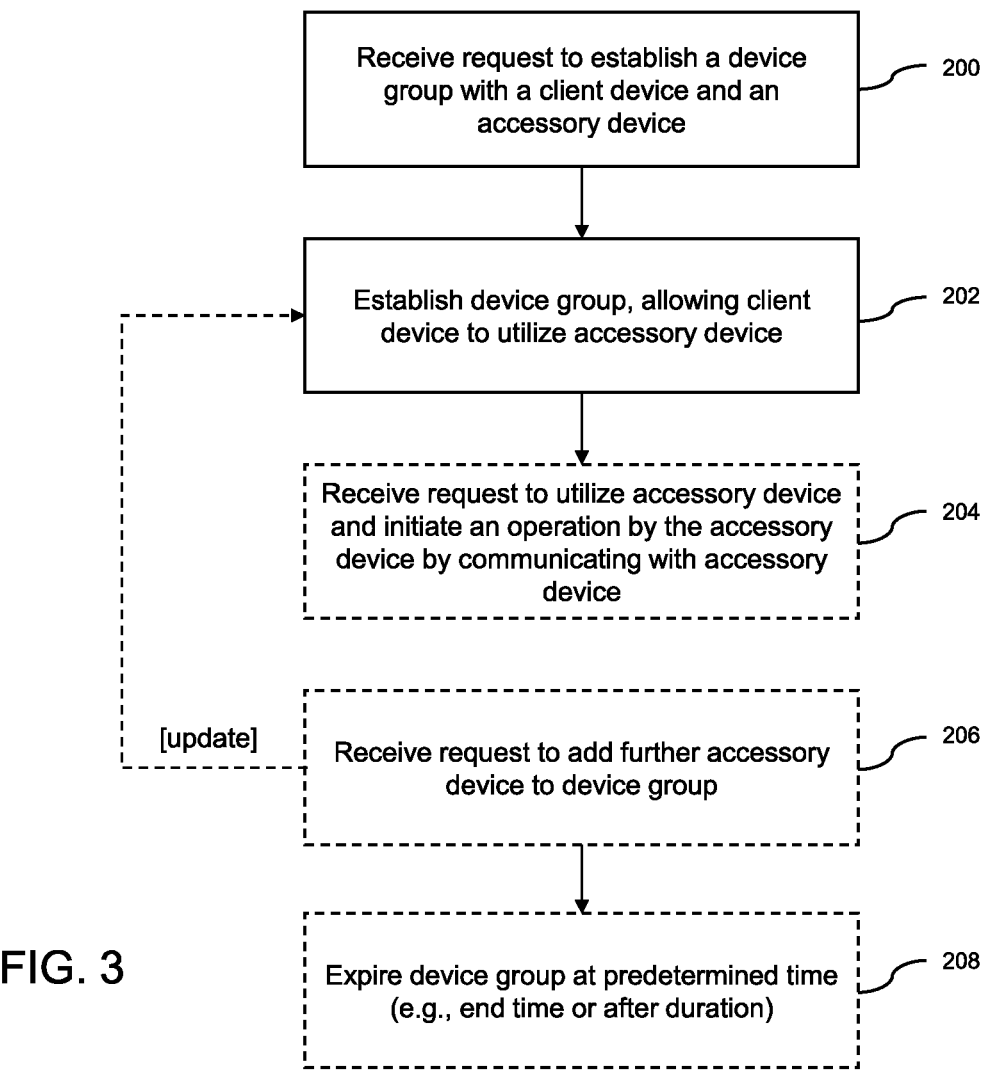
FIG. 3 is a flow chart illustrating an example set of computer executable instructions that can be executed for pairing devices to establish device groups.

Referring now to FIG. 3, a flow chart is provided illustrating example computer executable instructions that can be implemented in establishing logical pairings between client and accessory devices 22, 24 to enable the logical pairings to allow the client devices 22 to utilize the accessory devices 24. At block 200, the server 30, 32 receives a request to establish a device group that includes a client device 22 and an accessory device 24. For example, as shown in FIG. 2, this may include receiving a request from an user 26 via their smartphone client device 122 to establish a device group with a card reader 124c. The request can be generated by the client device 122 identifying the card reader 124c and providing an indication (e.g., identifier) of both the client device 122 and the card reader accessory device 124c. This identification process can be done in various ways. For example, if the devices 122, 124c are both equipped with a short-range communication protocol such as an NFC capability, Bluetooth, or IR, the smartphone client device 122 can identify the specific card reader 124c and notify the server 30, 32 of the proposed logical pairing and establishment of the group, e.g., Group A in FIG. 2. Other identification processes can be used, such as manually entering a code displayed or written on the card reader accessory device 124a, scanning a barcode displayed on a screen or housing of the card reader accessory device 124a, or using another pairing process such as those traditionally used to pair Bluetooth devices using a visual or audible code.

The request sent to the server 30, 32 by the client device 22 is received by the server 30, 32 at block 200. Since the request identifies both the client device 22 and the accessory device 24, the server 30, 32 can establish a device group that includes these devices 22, 24 (e.g., smartphone client device 122 and card reader accessory device 124c), allowing the client device 22 to utilize the accessory device 24. For example, the smartphone client device 122 can send an instruction that includes a payment amount owing to the server 30, 32, to have the instruction routed to the paired card reader accessory device 124c in the device group to enable the card reader to be triggered to accept payment, e.g., via a card tap, swipe, or insertion. The input obtained by the card reader accessory device 124c may then be routed back to the smartphone client device 122 via the connection to the server 30, 32. It can be appreciated that in this example, the card reader accessory device 124c is a network-enabled device that can communicate with at least the local network device 30 in order to enable communications between it and the smartphone client device 122. However, it can be appreciated that other accessory devices 24 may not be capable of communicating directly with the local network device 30 and/or cloud-based server 32. In such cases, a short range communication between devices 22, 24 can be used to complete the operation, with the network-connected client device 22 updating the server 30, 32 when completed. That is, the devices 22, 24 in a device group can utilize any available communication channel between devices or the network to perform the operations defined for the group pairings.

In addition to receiving a request and establishing a device group in blocks 200, 202, certain optional operations can also be performed. For example, at block 204, the server 32 can receive a request from the client device 22 to utilize the accessory device 24 and initiate an operation by the accessory device 24. This can be performed by communicating with the accessory device 24, e.g., via the server 30, 32 or by facilitating a secure device-to-device communication between the client device 22 and the accessory device 24. Also, as shown in block 206, the server 30, 32 can receive a request to add a further accessory device 24 to the group established in block 202. For example, while setting up a group, the client device 22 may add multiple accessory devices 24, one after another. The server 30, 32 can receive and process such a request and update the device group as indicated, which can return to block 202 to have further logical pairings created with that group. Similarly, the server 30, 32 can be responsible at block 208 for expiring the device group at a predetermined time. For example, an end time such as the end of an employee's shift or a time duration expiration can be used to determine when to expire the group. On-demand expiry can also be enabled, for example, using a forget this device or forget this group option as noted above. At that time, the devices 22, 24 in that group may be unable to communicate with and/or utilize each other until they are added to new device groups, either dynamically or at the beginning of a next shift or designated period of time.

Figure 4:
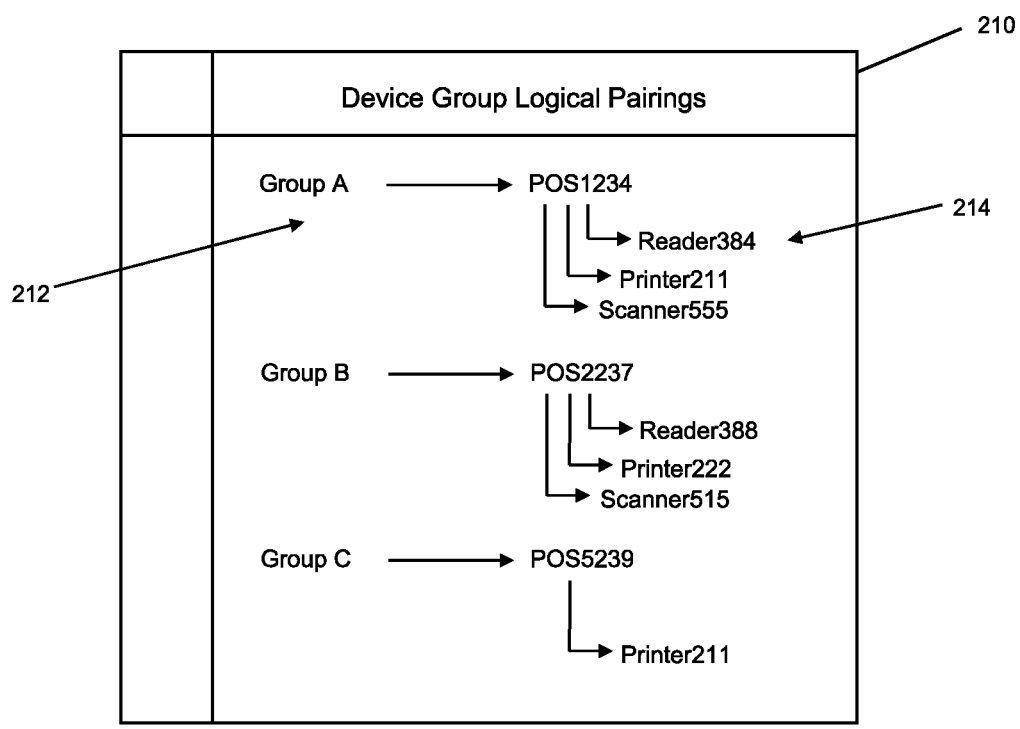
FIG. 4 shows an example of a logical pairing table for a set of device groups.

FIG. 4 illustrates an example of a device group logical pairings table 210. It can be appreciated that the graphical tabular format shown in FIG. 4 is for illustrative purposes only and any suitable data structure can be used. In this example, hierarchical entries are listed, with a group identifier 212 and a set of logical pairings 214. For example, Group A in this example includes a client device 22 identified as POS1234, which is currently paired with accessory devices 24 named Reader384, Printer211, and Scanner555. Group B includes a client device 22 identified as POS2237, which is currently paired with accessory devices 24 named Reader388, Printer222, and Scanner515. Group C includes a client device 22 identified as POS5239, which is currently paired with an accessory device 24 named Printer211. That is, Groups A and C share Printer211 and thus each include a logical pairing to that accessory device 24. The logical pairings table 210 shown in FIG. 4 therefore includes the Groups A, C from FIG. 2. The table 210 shown in FIG. 4 can also include graphical representations of the pairings, such as by creating a device graph with each node being a device 22, 24 and each edge representing a logical pairing. Any other suitable data structure or element can be used to show the same current pairing and grouping data for the server 30, 32 to utilize when receiving requests such as those depicted in FIG. 3.

Figure 5:
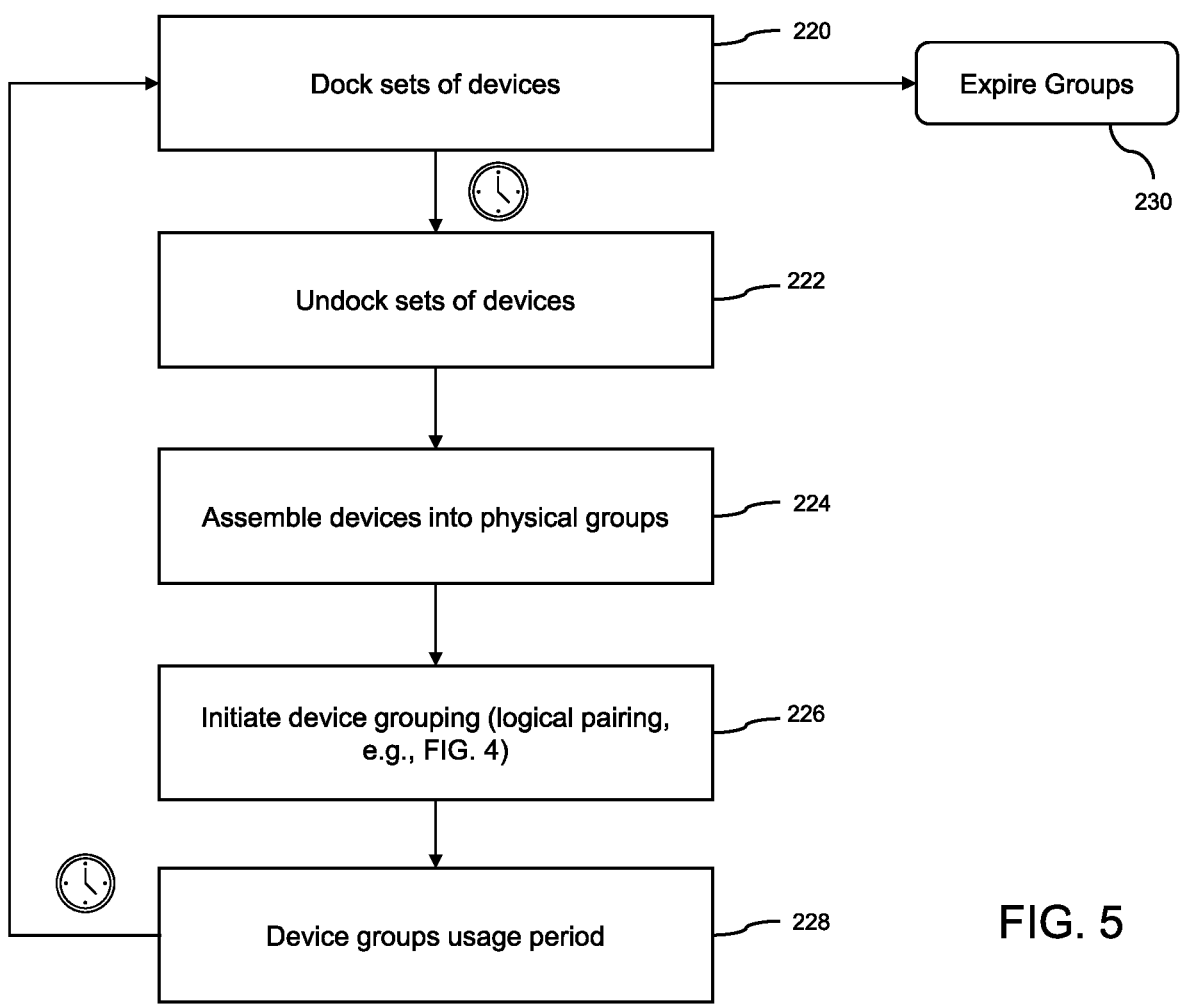
FIG. 5 is a flow chart illustrating an example of a multiple group pairing process that may include executing the operations of FIG. 4.

FIG. 5 is a flow chart illustrating operations that can be performed in a device grouping workflow used in a setting such as that shown in FIG. 1, which includes a set of multiple client devices 22 and at least one set of multiple accessory devices 24, commonly multiple sets of multiple accessory devices 24. At block 220, the sets of devices 22, 24 are docked or otherwise stored, e.g., for charging overnight. Block 220 in this example can be implemented at both the beginning and end of a shift. Assuming that the process shown in FIG. 5 begins at the beginning of a shift, a number of users 26 undock sets of devices 22, 24 at block 222, e.g., by selecting the devices 22, 24 they plan to use for that shift, which can include assembling devices 22, 24 into physical groups at block 224, e.g., by gathering up such devices 22, 24. The groups of devices, thus physically assembled in groups, can be used to initiate the device grouping process with the server 30, 32 at block 226. This may include initiating and executing at least blocks 200 and 202 in FIG. 4. This establishes the logical pairings at the server 30, 32 (e.g., in the logical pairings table 210) such that a device groups usage period can begin at block 228 for a predetermined amount of time, expiring for example after detecting that the devices are docked at block 220 and the groups then expired at block 230.

Figure 6:
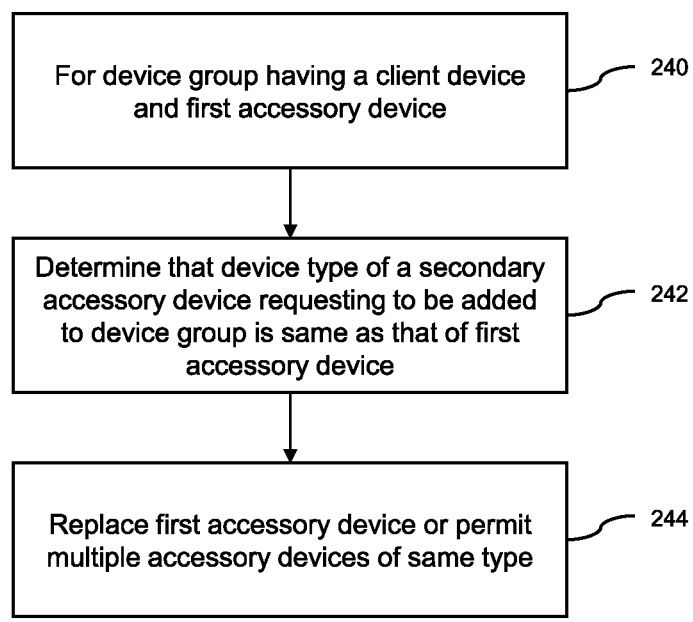
FIG. 6 is a flow chart illustrating an example set of computer executable instructions that can be executed for handling requests to pair accessory devices of the same type.

When forming device groups, the server 30, 32 may need to handle requests for similar types of accessory devices 24 to be added to a device group or to execute a replacement of one accessory device 24 with another accessory device 24, which can be of the same, similar or even a different device type. For example, a device group may wish to add multiple printer accessory devices 124a to enable a roaming user 26 to print a receipt at one of two different locations. Referring now to FIG. 6, a flow chart is provided illustrating example computer executable instructions that can be implemented in handling requests with a similar or same type of accessory device 24. At block 240, it is assumed that a device group has been formed which includes a client device 22 and a first accessory device 24. At block 242, the server 30, 32 determines (e.g., via a request received from the client device 22 or first accessory device 24) that the device type of a secondary accessory device 24 that is requested to be added to the device group is the same as that of the first accessory device 24. Upon making this determination, the server 30, 32 can either replace the first accessory device 24 with the second accessory device 24 at block 244, or permit multiple accessory devices of the same type in that device group. Whether to replace or permit multiple devices of the same type can be determined automatically by the server 30, 32 or may require a further step of verification, e.g., by contacting the user 26 associated with that device group through a different channel. The request sent to the server 30, 32 can also include such a request type, authorized by the user 26, e.g., by including a credential such as a token, digital signature, or digital certificate. The server 30, 32 may then update the device group to add or replace a logical pairing, e.g., by updating the logical pairings table 210.

The server 30, 32 can also be configured to handle dynamic pairing requests, e.g., to enable users 26 to dynamically pair with an accessory device 24 based on a criterion such as proximity, signal strength, or accessory sub-type. For example, an user 26 that needs to print warranty information (or other full-size document) in addition to a sales receipt may require a larger printer (i.e., different sub-type of printer) and may request to dynamically pair with a particular printer of that size. Similarly, the user 26 may wish to have the server 30, 32 assist in automatically determining the closest printer to increase efficiencies and speed in a transaction workflow. For example, the server 30, 32 may dynamically pair the client device 22 with a particular accessory device 24 based on proximity and send a notification to the user 26, e.g., via the POS app or another channel such as a text or push notification to instruct the user 26 as to where the job is being handled.

Figure 7:
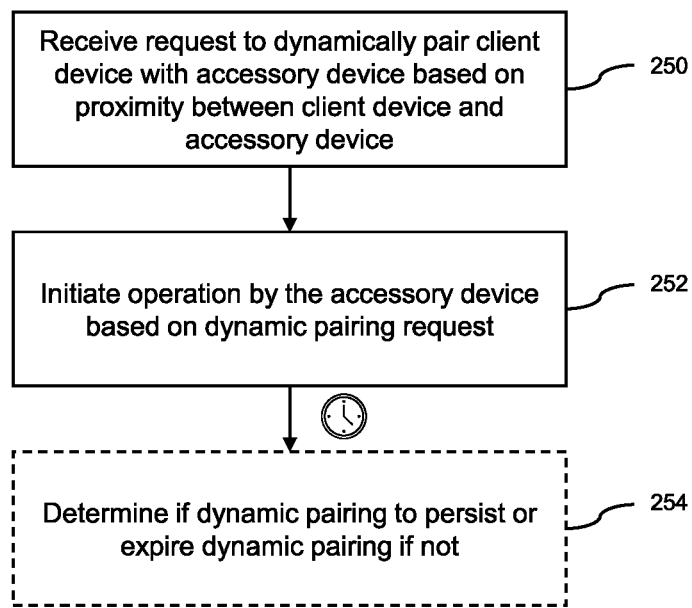
FIG. 7 is a flow chart illustrating an example set of computer executable instructions that can be executed for performing a dynamic pairing of devices based on proximity.

In FIG. 7, a flow chart is provided illustrating example computer executable instructions that can be implemented in dynamically pairing a client device 22 with an accessory device based on a proximity-based criterion. At block 250, the server 30, 32 receives a request to dynamically pair a client device 22 with an accessory device 24 based on proximity between this client device 22 and that accessory device 24, e.g., requesting it be paired temporarily and dynamically with the closest accessory device 24 to the client device 22 at that time. This can include the server 30, 32 pinging or otherwise looking up location data for the relevant devices 22, 24 and determine the most proximate one. Then, at block 252, the server 30, 32 can initiate an operation by the accessory device 24 based on the dynamic pairing request, e.g., to execute a print job at the closest printer. Optionally, at block 254, the server 30, 32 can determine if the dynamic pairing is to persist, e.g., for a predetermined amount of time. This can be set by the requesting user 26 or via some other criterion such as an automatic timeout period. At block 254 the server 30, 32 either immediately or after some specified time may then expire the dynamic pairing. In this way, for example, a roaming user 26 would need to dynamically pair with the closest printer again at the next transaction to ensure the appropriate accessory device 24 is being used.

Figure 8:
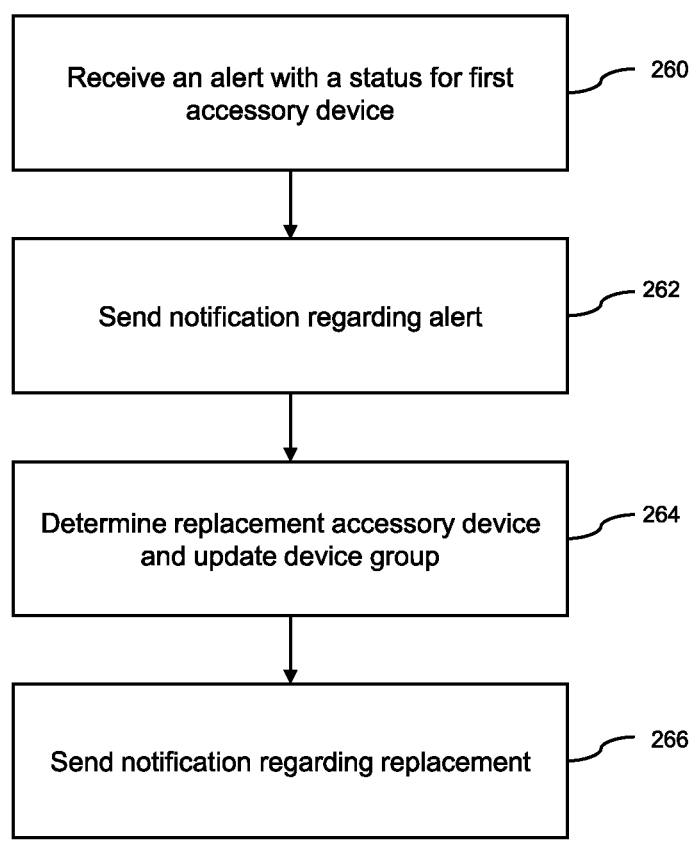
FIG. 8 is a flow chart illustrating an example set of computer executable instructions that can be executed for generating an alert and a notification related to a status of an accessory device.

Referring now to FIG. 8, a flow chart is provided illustrating example computer executable instructions that can be implemented in responding to alerts associated with client or accessory devices 22, 24 and generating notifications therefor. At block 260, the server 30, 32 receives an alert with a status for a first accessory device 24. For example, a heartbeat or other communication between the accessory device 24 and the server 30, 32 can be used to periodically report battery level, signal strength, amount of paper left, etc. The heartbeat or status query may be periodic, or triggered to transmit based on actions in the POS checkout workflow such as unlocking the screen, starting to scan items, moving from a cart-building procedure to a checkout payment procedure. This can generate or be detected as an alert at block 260, which initiates a notification to be sent regarding the alert, at block 262. For example, if a device has a low battery, the user 26 in that device group or an administrator 36 (e.g., supervisor for the user 26) can be contacted to ensure that the device's battery or the device itself is replaced. At block 264, the server 30, 32 determines that a replacement accessory device 24 has been made in this example, and updates the device group, e.g., in the logical pairings table 210. At block 266, the notification is sent regarding the replacement, e.g., to the user 26 and/or administrator 36. The process illustrated in FIG. 8 can be utilized in various scenarios. For example, an administrator 36 can be tasked with receiving alerts and/or notifications to track the health of the accessory devices 24 (and client devices 22) used by the users 26. When necessary, the administrator 36 can initiate a device or battery replacement, for example, and seamlessly hand off the devices in the environment 10 to avoid inefficient technical difficulties. In this way, preemptive action can be taken.

Figure 9:
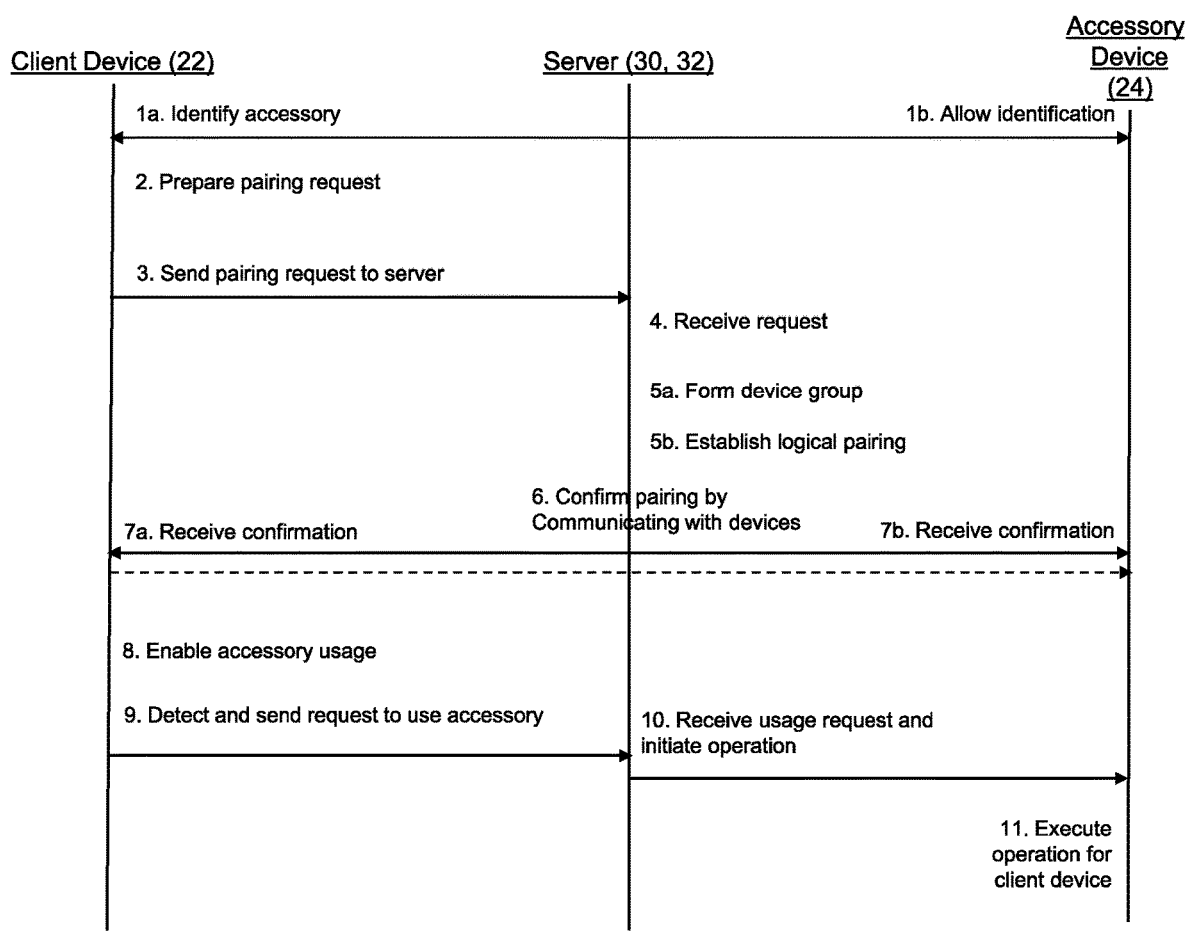
FIG. 9 is a sequence diagram illustrating an example of a logical pairing process to establish a device group.

Turning now to FIG. 9, a sequence diagram is provided, which illustrates an example sequence of operations that may be performed by the client device 22, the server 30, 32, and the accessory device(s) 24 in establishing and utilizing logical pairings and device groups as herein described. In this example the client device 22 initiates a logical pairing and the establishment of a device group through an interaction that can be directly between the devices or via a connection with the server 30, 32. For example, a smartphone client device 122 may use a short-range communication protocol or a camera scanning tool to make an identification of the accessory device 24 at step 1a based on an identifier presented or otherwise provided by the accessory device 24 at step 1b. In this way, the client device 22 can initiate a local data exchange between itself and the accessory device 24 in order to obtain an identifier for the accessory device 24 (e.g., a unique ID) or other credential such as a token, one-time code, key, certificate, signature, etc. Any suitable credential can be used, including both permanent and ephemeral identifiers, tokens, or codes. For example, a smartphone client device 122 may use an onboard camera to scan a barcode displayed by a card reader accessory device 124c or may use an NFC tap action to make a cryptographic exchange and obtain a one-time code or token to use in identifying the accessory device 124c to the server 30, 32.

With the identification exchange complete at step 1, the client device 22 can prepare a pairing request at step 2. This can include generating a data packet that includes at least an identifier for the client device 22 and an identifier for the accessory device 24. Other data elements can be included, such as a one-time code, token, or other credential as discussed above. The data packet can be signed and/or encrypted to add one or more layers of cryptographic protection. The pairing request is then sent to the server 30, 32 at step 3, which is received at step 4. At step 5a, the server 30, 32 forms the device group for the associated user 26 and establishes the logical pairing between the client device 22 and the accessory device 24. This can include creating a new entry or updating an existing entry in the logical pairings table 210. The server 30, 32 may then confirm the pairing, e.g., by sending a confirmation message to each of the client device 22 and the accessory device 24. This optional confirmation can be used to ensure that the request is from a legitimate device within the system. At step 7a, the client device 22 receives the confirmation while at step 7b the accessory device 24 also receives the confirmation. It can be appreciated that while the confirmation in step 7b is shown as being sent directly from the server 30, 32 to the accessory device 24, the confirmation could also be sent via the client device 22 (as shown in dashed lines), e.g., if the accessory device 24 is tethered by a local connection only and is thus indirectly in communication with server 30, 32.

With the accessory device 24 now paired with the client device 22 to form a device group, the client device 22 is enabled to use the accessory device 24, represented by step 8 in FIG. 9. At step 9, the client device 22 detects and sends a request to use the accessory, e.g., to utilize the card reader 124c or printer 124a in completing a transaction. In this example, the request is sent to the server 30, 32, which receives the request and initiates the operation at step 10. The server 30, 32 can determine from the logical pairings table 210 that the operation associated with the request is to be performed by the accessory device 24 and by initiating the operation, communicates with the accessory device 24 such that the accessory device executes the operation for the client device 22. It can be appreciated that while the sequence diagram shown in FIG. 9 includes a single accessory device 24, similar operations can be repeated with other accessory devices 24. Moreover, steps 8-11 can be repeated during the device group's existence to repeatedly use the accessory device(s) 24.

Figure 10:
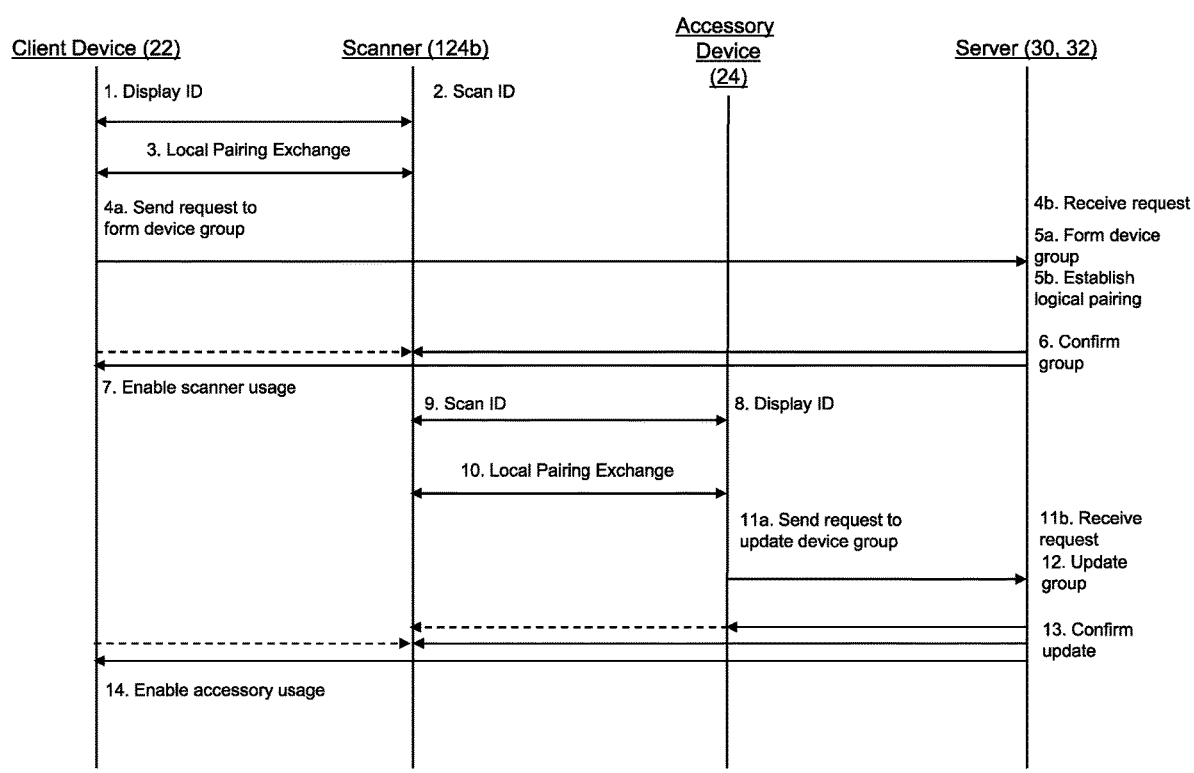
FIG. 10 is a sequence diagram illustrating an example of a logical pairing process to establish a device group having multiple accessory devices and using one of the accessory devices to add the other of the accessory devices to the group.

Referring now to FIG. 10, a sequence diagram is illustrated for a scenario in which a scanner accessory device 124b is used as a proxy to add an additional accessory device 24 to a device group. At step 1, the client device 22 displays an identifier (ID) or other scannable indicia such as a barcode. This enables the scanner 124b to scan the ID at step 2 to initiate a local pairing exchange between the client device 22 and the scanner 124b at step 3. For example, the ID may provide a public key, token, one-time code, or other credential that the scanner can use to pair with the client device 22 over a short-range communication protocol such as Bluetooth, IR, NFC, etc. In this way, the scanner 124b can be used to quickly begin the device group formation using its native operation, namely the scanning operation. At step 4a the client device 2 sends a request to the server 30, 32 to form the device group with the scanner 124b identified via the local pairing exchange at step 3. In this example, the client device 22 is used to perform the server-based communications, however, it can be appreciated that the scanner 124b or another accessory 24 or device in the device group could similarly create and send such a request at step 4a. The request is received by the server 30, 32 at step 4b and this initiates a device group formation at step 5a. The server 30, 32 then establishes the logical pairing between the client device 22 and the scanner 124b at step 5b. The server 30, 32 may then confirm the group and its formation at step 6, by communicating with each device, namely the client device 22 and the scanner 124b. As shown in dashed lines in FIG. 10, if the scanner 124b is only capable of communicating with the server 30, 32 via the client device 22, the client device 22 can send a confirmation message to the scanner 124b via a local pairing connection.

At step 7, the client device 22 is able to use the scanner 124b, e.g., by using a credential sent in the confirmation that is required by the scanner 124b before relaying scanned data to the client device 22, e.g., in performing a scan of an item in the retail environment 10. In this example, the scanner 124b is used to add another accessory device 24 to the device group, as a proxy for any exchange such as that shown in FIG. 9 between such devices 22, 24. At step 8 the accessory device 24 displays an ID or other indicia to enable the scanner 124b to scan the ID at step 9 and initiate a local pairing exchange at step 10, similar to that performed in steps 1-3. The scanner 124b can therefore be used by the user 26 to add more accessory devices quickly and conveniently 24 to the device group 22, without necessarily involving the client device 22. For example, the scanner 124b can be used to scan a barcode displayed by a card reader 124c after pressing a pairing button, which initiates a local pairing exchange at step 10 to provide the accessory device 24 with a credential that allows the server 30, 32 to authenticate the addition request. Such a credential can be sent to the server 30, 32 directly by the accessory device 24 at step 11a. It can be appreciated that such a request can also be sent by the scanner 124b if a network connection is available, or the request can be relayed to the server 30, 32 via the client device 22 by initiating a short-range exchange between the scanner 124b and the client device 22. At step 11b, the server 30, 32 receives the request to update the group and does so at step 12. The update can be confirmed at step 13 by having the server 30, 32 send update confirmation messages to the accessory device 24, the scanner 124b, and the client device 22. As with the original request to form the device group, and as shown in dashed lines, the accessory device 24 or the client device 22 in this example may be used to relay the update confirmation message to the scanner 124b if a network connection to the server 30, 32 is not available to the scanner 124b. At step 14, the client device 22 may then begin using the accessory device 24, e.g., by sending data to the accessory device 24 via the server 30, 32 to have the accessory device 24 perform an operation such as reading a payment card, printing a receipt, etc.

Figure 11:
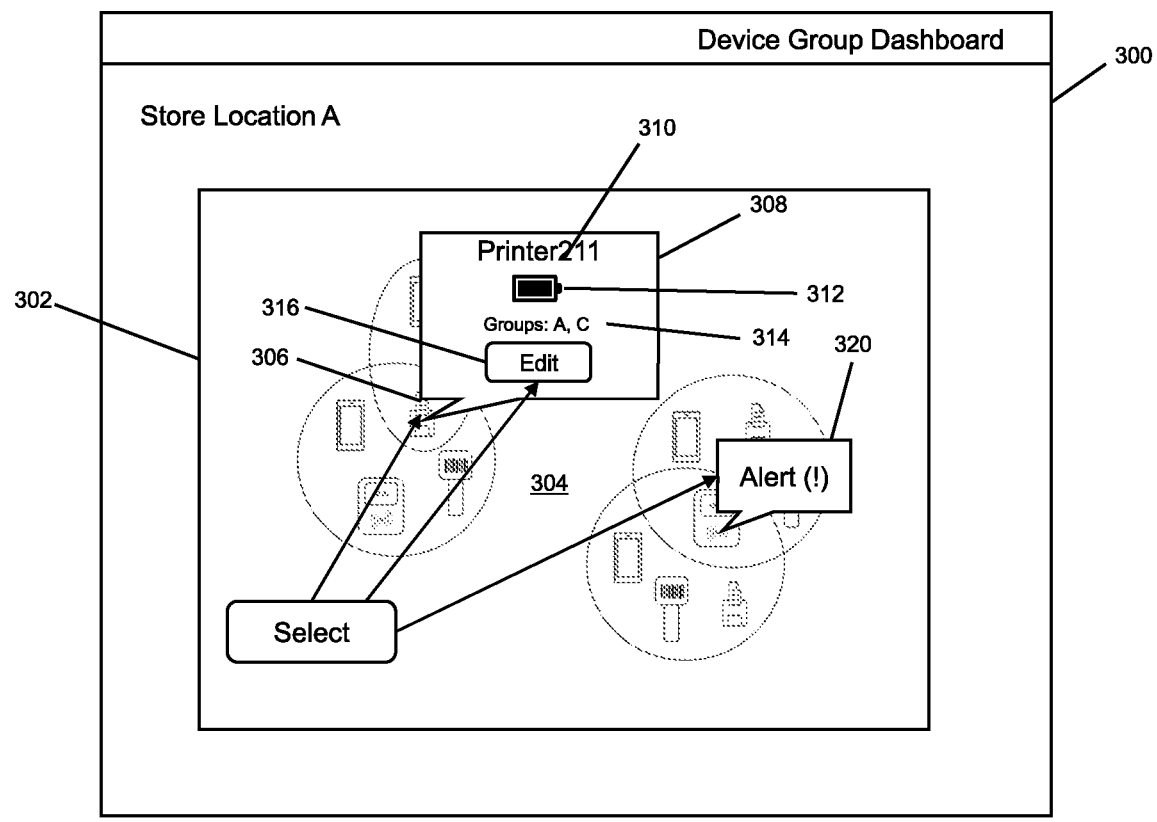
FIG. 11 illustrates an example of a user interface displaying a device group dashboard, which can be interacted with to view and determine information regarding device groups at a location.

In addition to enabling sets of devices 22, 24 to be grouped for periods of time such as an employee shift, and/or dynamically as needed, the system illustrated in FIGS. 1 and 2 also enables an administrator 36 and, if permitted, the employees 32, to visualize and control the pairings established in the device groups, via a dashboard or other graphical user interface (GUI). FIG. 11 illustrates an example of a device group dashboard GUI 300. The GUI 300 can be displayed by an administrator device 38, a client device 22 used by an user 26 and/or administrator 36, or by another entity either locally or from a remote location such as a head office or control room. In the example shown in FIG. 1, and illustrating one example scenario, a supervisor user 26 can utilize the dashboard GUI 300 to keep track of the device groups to monitor for alerts, intervene to break or make connections, among other things.

In this example, the dashboard GUI 300 displays details of a particular retail environment 10, namely Store Location A. A device group map 302 is also displayed, which includes a visualization of the device groups. In this example, the graphical illustration of FIG. 2 is replicated in the map 302 to show both the logical pairings and the overlap between groups where appropriate.

Also shown in FIG. 11 are an alert 320 and a status pop-up window 308. The alert 320 can be displayed when a condition, message, or other actionable item associated with a device 22, 24 is detected by the server 30, 32. As shown, the alert 320 can provide a visual indicator that can be selected in order to drill-down into the contents/details of the alert 320 and determine if a notification or other action should be triggered. The pop-up window 308 can provide status information at any time that a device 22, 24 in the map 302 is selected. In this case, Printer211 was selected and a battery level 310, group associations 314, and an edit option 316 are included in the pop-up window 308. The edit option 316 can be selected to enable options and settings associated with the corresponding device 22, 24, to be accessed, in this case Printer211. For example, if Printer211 is low on battery or paper, the supervisor user 26 could use the edit option 316 to disassociate Printer211 from Groups A and C to pre-empt an error, power failure, or other disruption in the real-world workflow. The supervisor user 26 could at the same time use the dashboard GUI 300 to initiate a notification to the employee(s) that are using Printer211 to notify them of the condition and have them add a different printer or to have the printer 124*a* replaced.

Figures 12, 13:
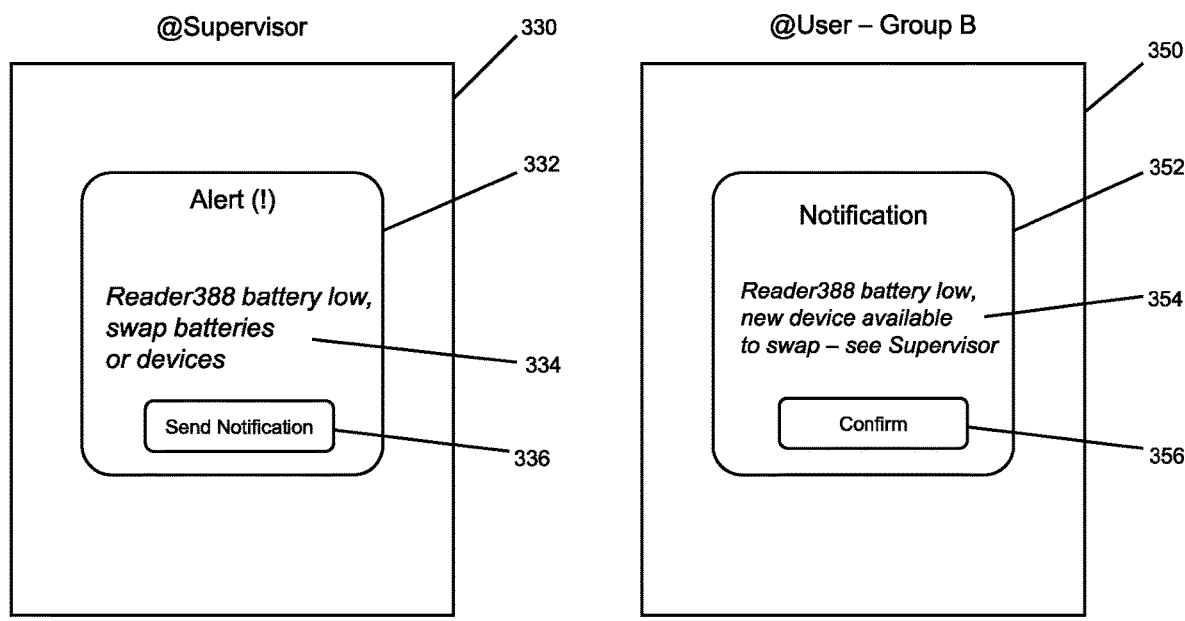
FIG. 12 illustrates an example of a user interface displaying a device group alert provided to an administrator.
FIG. 13 illustrates an example of a user interface displayed a device group notification provided to a user associated with a device group.

An example of an alert 332 is shown in FIG. 12, which is displayed on a device display 330 used by Supervisor. The alert 332 includes a message 334, which indicates that the Reader388 has a low battery and suggests that the batteries (or device itself) be swapped. Supervisor can use this alert 332 to initiate an action pre-emptively instead of waiting for an error or disruptive state to occur. It can be appreciated that the alert 332 can be accessed from the dashboard GUI 300 by selecting the alert 320 therein, or can be sent directly to Supervisor, e.g., via an app notification, email, text message, push notification, etc. The alert 332 includes a notification option 336 which can be selected to trigger a notification to be sent to one or more affected parties, such as any user 26 that is using Reader388.

FIG. 13 illustrates an example of a notification 352 that has been sent to User of Group B, which is an affected party in this example. The notification 352 includes a message 354 indicating the contents of the alert 332 and instructs User of Group B to see Supervisor to swap Reader388 with a new device with charged batteries. It can therefore be appreciated that alerts 332 and notifications 352 can be used by the server 30, 32 or other entity in the system that can obtain status information, when directly or via the dashboard UI 300, to manage a fleet of devices 22, 24 more efficiently, in a retail environment 10 or any other environment using such sets of devices 22, 24.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the devices described herein, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method comprising:
receiving, at a server associated with a plurality of client devices and a plurality of accessory devices, a first request to establish a device group comprising a first client device of the plurality of client devices and a first accessory device of the plurality of accessory devices, the first client device having identified the first accessory device and initiated the first request identifying the first client device and the first accessory device to the server;
establishing the device group comprising the first client device and the first accessory device by logically pairing the first client device with the first accessory device;
confirming the logical pairing by communicating with at least one of the first client device and the first accessory device using an identifier determined from the first request; and
redirecting data between the first client device and the first accessory device;
wherein, the device group, once established, allows the first client device to utilize the first accessory device.

2. The method of claim 1, wherein redirecting data between the first client device and the first accessory device comprises:
receiving a second request from the first client device to utilize the first accessory device; and
initiating an operation by the first accessory device based on the second request, by communicating with the first accessory device.

3. The method of claim 1, further comprising:
receiving a request to add a second accessory device to the device group, the request to add the second accessory device comprising an identifier for the second accessory device; and
updating the device group by logically pairing the first client device, the first accessory device, and the second accessory device.

4. The method of claim 3, further comprising:
determining that a device type of the second accessory device is the same as a device type of the first accessory device; and
replacing the first accessory device with the second accessory type in the device group.

5. The method of claim 3, further comprising:
determining that a device type of the second accessory device is the same as a device type of the first accessory device; and
updating the device group to comprise the first client device and a plurality of first accessories of the same device type.

6. The method of claim 1, wherein the first request comprises a request to dynamically establish the device group with the first accessory device based on a proximity between the first client device and the first accessory device, the method comprising:
initiating an operation by the first accessory device based on the request to dynamically establish the device group.

7. The method of claim 6, wherein initiating the operation comprises:
receiving data from the first client device; and
sending the data to the first accessory device to execute the operation.

8. The method of claim 1, further comprising:
receiving a further request to establish a logical pairing in the device group between a second client device and one of the plurality of accessory devices, the further request identifying the second client device and the one of the plurality of accessory devices; and
establishing the logical pairing within the group between the second client device and the one of the plurality of accessory devices;
wherein, the logical pairing, once established, allows the second client device to utilize the one of the plurality of accessory devices identified in the further request.

9. The method of claim 1, further comprising expiring the device group at a defined time.

10. The method of claim 9, wherein the defined time comprises at least one of an end time or a time duration since the device group was established.

11. The method of claim 1, further comprising:
receiving an alert comprising a status for the first accessory device; and
based on the status, updating the device group and communicating with a first replacement device to replace a functionality of the first accessory device for the first client device in the device group.

12. The method of claim 1, wherein the first client device comprises a point of sale (POS) application for a retail environment and wherein the first accessory device executes at least one operation in a retail POS workflow implemented via the POS application.

13. The method of claim 3, further comprising communicating with the first accessory device by:
communicating with the second accessory device to establish the logical pairing with the second accessory device; and
initiating establishment of the device group to comprise the first accessory device via the second accessory device.

14. The method of claim 13, wherein the second accessory device comprises a scanner, the scanner being paired with the first client device as a proxy to add the first accessory device to the device group.

15. The method of claim 1, further comprising:
displaying a control panel user interface, the control panel user interface providing a visual depiction of the device group comprising the first client device and the first accessory device.

16. A server comprising:
a processor;
a communications module; and
at least one memory, the at least one memory storing computer executable instructions that, when executed by the processor, utilize the processor and communications module to:
receive, at the server, the server being associated with a plurality of client devices and a plurality of accessory devices, a first request to establish a device group comprising a first client device of the plurality of client devices and a first accessory device of the plurality of accessory devices, the first client device having identified the first accessory device and initiated the first request identifying the first client device and the first accessory device to the server;
establish the device group comprising the first client device and the first accessory device by logically pairing the first client device with the first accessory device;
confirm the logical pairing by communicating with at least one of the first client device and the first accessory device using an identifier determined from the first request; and
redirect data between the first client device and the first accessory device;
wherein, the device group, once established, allows the first client device to utilize the first accessory device.

17. The server of claim 16, wherein redirecting data between the first client device and the first accessory device comprises instructions to:
receive a second request from the first client device to utilize the first accessory device; and
initiate an operation by the first accessory device based on the second request, by communicating with the first accessory device.

18. The server of claim 16, further comprising instructions to:
receive a request to add a second accessory device to the device group, the request to add the secondary accessory device comprising an identifier for the second accessory device; and
updating the device group by logically pairing the first client device, the first accessory device, and the second accessory device.

19. The server of claim 18, further comprising instructions to:
determine that a device type of the second accessory device is the same as a device type of the first accessory device; and
replace the first accessory device with the second accessory type in the device group.

20. The server of claim 19, further comprising instructions to:
determine that a device type of the second accessory device is the same as a device type of the first accessory device; and
updating the device group to comprise the first client device and a plurality of first accessories of the same device type.

21. The server of claim 16, further comprising instructions to:
receive a further request to establish a logical pairing in the device group between a second client device and one of the plurality of accessory devices, the further request identifying the second client device and the one of the plurality of accessory devices; and
establish the logical pairing within the group between the second client device and the one of the plurality of accessory devices;
wherein, the logical pairing, once established, allows the second client device to utilize the one of the plurality of accessory devices identified in the further request.

22. A non-transitory computer readable medium comprising computer executable instructions that, when executed by a processor of a server, cause the server to:
receive, at the server, the server being associated with a plurality of client devices and a plurality of accessory devices, a first request to establish a device group comprising a first client device of the plurality of client devices and a first accessory device of the plurality of accessory devices, the first client device having identified the first accessory device and initiated the first request identifying the first client device and the first accessory device to the server;
establish the device group comprising the first client device and the first accessory device by logically pairing the first client device with the first accessory device;
confirm the logical pairing by communicating with at least one of the first client device and the first accessory device using an identifier determined from the first request; and
redirect data between the first client device and the first accessory device;
wherein, the device group, once established, allows the first client device to utilize the first accessory device.

* * * * *